US011991707B2

(12) United States Patent
Zhang et al.

(10) Patent No.: US 11,991,707 B2
(45) Date of Patent: May 21, 2024

(54) INDICATION INFORMATION TRANSMISSION METHOD AND APPARATUS (71) Applicant: HUAWEI TECHNOLOGIES CO., LTD., Guangdong (CN)

(72) Inventors: Xu Zhang, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 17/244,310

(22) Filed: Apr. 29, 2021

(65) Prior Publication Data
US 2021/0250925 A1 Aug. 12, 2021

Related U.S. Application Data (63) Continuation of application No. PCT/CN2019/113273, filed on Oct. 25, 2019.

(30) Foreign Application Priority Data

Nov. 2, 2018 (CN) .......................... 201811303090.6

(51) Int. Cl.
*H04J 3/00* (2006.01)
*H04W 72/23* (2023.01)
(Continued)

(52) U.S. Cl.
CPC ....... *H04W 72/23* (2023.01); *H04W 74/0808* (2013.01); *H04W 72/0446* (2013.01)

(58) Field of Classification Search
CPC ..... H04W 72/00; H04W 72/04; H04W 74/08; H04W 72/042; H04W 72/0446; H04W 74/0808
(Continued)

(56) References Cited

U.S. PATENT DOCUMENTS 9,609,647 B2* 3/2017 You .................... H04L 5/0051
10,015,783 B2* 7/2018 Yin ..................... H04L 5/0007
(Continued)

FOREIGN PATENT DOCUMENTS

CN 104348579 A 2/2015
CN 104540164 A 4/2015
(Continued)

OTHER PUBLICATIONS

Office Action in Chinese Application No. 201811303090.6, dated Feb. 20, 2021, 15 pages.
(Continued)

*Primary Examiner* — Marceau Milord
(74) *Attorney, Agent, or Firm* — Fish & Richardson P.C.

(57) ABSTRACT

This application provides an example indication information transmission method. The method includes sending, by a network device, first indication information. The first indication information is used to indicate a time domain position at which second indication information is monitored. The method also includes sending, by the network device, the second indication information. The second indication information includes information about a channel occupancy time of the network device and/or slot format information of one or more slots corresponding to the channel occupancy time.

20 Claims, 5 Drawing Sheets

(51) Int. Cl.
  *H04W 74/0808* (2024.01)
  *H04W 72/0446* (2023.01)
(58) Field of Classification Search
  USPC .......................................................... 370/336
  See application file for complete search history.

(56) References Cited

U.S. PATENT DOCUMENTS

| | | | | |
|---|---|---|---|---|
| 10,091,772 | B2* | 10/2018 | Lin | H04L 5/0057 |
| 10,194,432 | B2* | 1/2019 | Dinan | H04W 72/0446 |
| 10,638,519 | B2* | 4/2020 | Kim | H04W 74/006 |
| 11,523,379 | B2* | 12/2022 | Dinan | H04W 72/0453 |
| 11,553,468 | B2* | 1/2023 | Dinan | H04W 72/23 |
| 11,582,799 | B2* | 2/2023 | Babaei | H04W 74/006 |
| 11,665,750 | B2* | 5/2023 | Kim | H04L 5/0044 370/336 |
| 11,729,828 | B2* | 8/2023 | Zhang | H04W 74/08 370/329 |
| 11,758,525 | B2* | 9/2023 | Dinan | H04W 72/0446 370/330 |
| 11,770,220 | B2* | 9/2023 | Bala | H04J 11/00 370/329 |
| 11,800,508 | B2* | 10/2023 | Lin | H04W 72/0446 |
| 2017/0142693 | A1* | 5/2017 | Yin | H04L 5/0007 |
| 2017/0223677 | A1* | 8/2017 | Dinan | H04W 72/0446 |
| 2018/0343670 | A1 | 11/2018 | Park et al. | |
| 2020/0053771 | A1* | 2/2020 | Jeong | H04W 74/0866 |
| 2020/0068546 | A1* | 2/2020 | Wu | H04W 16/14 |
| 2020/0120646 | A1* | 4/2020 | Dinan | H04L 5/0053 |
| 2020/0236636 | A1* | 7/2020 | Liu | H04W 56/001 |
| 2020/0337036 | A1* | 10/2020 | Dinan | H04L 5/0091 |
| 2021/0167905 | A1* | 6/2021 | Bala | H04L 5/0007 |
| 2021/0329695 | A1* | 10/2021 | Babaei | H04W 74/0808 |
| 2022/0077973 | A1* | 3/2022 | Dinan | H04L 5/0098 |

FOREIGN PATENT DOCUMENTS

| | | |
|---|---|---|
| CN | 107667565 A | 2/2018 |
| CN | 107889114 A | 4/2018 |
| EP | 3606243 A1 | 2/2020 |
| WO | 2017147760 A1 | 9/2017 |
| WO | 2018031068 A1 | 2/2018 |

OTHER PUBLICATIONS

PCT International Search Report and Written Opinion in International Application No. PCT/CN2019/113273, dated Jan. 16, 2020, 17 pages.
Extended European Search Report issued in European Application No. 19878061.1 dated Oct. 22, 2021, 14 pages.
Intel Corporation, "On the NR-unlicensed frame structure," 3GPP TSG RAN WG1 Meeting #94bis, R1-1810763, Chengdu, China, Oct. 8-12, 2018, 4 pages.
Lenovo, Motorola Mobility, "Frame structure for NR-U operation," 3GPP TSG RAN WG1 Meeting #94bis, R1-1810579, Chengdu, China, Oct. 8-12, 2018, 3 pages.
NEC, "Considerations on frame structure design for NR-U operation," 3GPP TSG RAN WG1 Meeting #94bis, R1-1810657, Chengdu, China, Oct. 8-12, 2018, 4 pages.

* cited by examiner

INDICATION INFORMATION TRANSMISSION METHOD AND APPARATUS

CROSS-REFERENCE TO RELATED APPLICATIONS

This application is a continuation of International Application No. PCT/CN2019/113273, filed on Oct. 25, 2019, which claims priority to Chinese Patent Application No. 201811303090.6, filed on Nov. 02, 2018. The disclosures of the aforementioned applications are hereby incorporated by reference in their entireties.

TECHNICAL FIELD

This application relates to the field of communications technologies, and in particular, to an indication information transmission method and apparatus.

BACKGROUND

Rapid development of wireless communications technologies leads to an increasing shortage of spectrum resources, and promotes exploration of unlicensed bands. A license assisted access (License Assisted Access, LAA) technology and an enhanced license assisted access (enhanced LAA, eLAA) technology are introduced into the 3GPP. In other words, an LTE/LTE-A system is deployed on an unlicensed spectrum in a non-standalone (Non-standalone) mode, and a licensed spectrum is used to maximize utilization of unlicensed spectrum resources.

When communication is performed in an unlicensed band (unlicensed band), a plurality of different wireless devices may need to share and use a same frequency domain resource. In this system, a network device occupies a shared frequency domain resource according to a rule. For example, clear channel assessment (clear channel assessment, CCA) is used to determine that a to-be-used frequency domain resource is idle, and then send or receive data on the idle frequency domain resource. After determining that the network device occupies the idle frequency domain resource, a terminal associated with the network device may receive data sent by the network device or send data to the network device. When performing the clear channel assessment, optionally, the network device assesses a to-be-monitored frequency domain resource in an energy monitoring manner. If an energy value that is detected exceeds a given threshold, it is considered that the channel is not idle. Otherwise, it is considered that the channel is idle. For example, a transmit end determines a busy or an idle state of the transmit end by monitoring power of a received signal on an unlicensed spectrum. If the power of the received signal is less than a specific threshold, it is considered that the unlicensed spectrum is in an idle state. The transmit end may send a signal on the unlicensed spectrum. Otherwise, the transmit end does not send the signal. This mechanism in which listening is performed before sending is referred to as listen before talk (Listen Before Talk, LBT).

Currently, there are mainly two LBT types: CAT4 LBT (also referred to as a type I channel access procedure) and CAT2 LBT (also referred to as a type 2 channel access procedure). For the CAT2 LBT, a device can access a channel after detecting that the channel is idle for 25 μs. For the CAT4 LBT, a device needs to access a channel in a random backoff manner. Specifically, the device selects a corresponding random backoff number based on a channel access priority (channel access priority) to perform backoff, and accesses the channel after determining that the channel is idle. The device may obtain a corresponding channel occupancy time (channel occupancy time, COT). Due to an uncertainty of an LBT result, the channel occupancy time obtained by the device is also uncertain.

When performing communication in a licensed hand (licensed band), the device needs to use slot format information (slot format information, SFI) to indicate a type of an OFDM symbol in one or more slots. SFI signaling is sent only on first three OFDM symbols of a slot, and an indicated slot format corresponds to an integer quantity of slots. If the slat format indicator information in the licensed hand is still used to indicate a type of an OFDM symbol in the COT to the terminal, an uncertainty of the channel occupancy time for communication in the unlicensed band cannot be adapted to.

SUMMARY

Embodiments of this application provide an indication information transmission method, in an indication manner described in the embodiments of this application, a device can obtain a format in a COT in advance, so that blind detection overheads can be reduced, or the device can sleep in advance, thereby reducing energy consumption.

According to a first aspect, an embodiment of this application provides an indication information transmission method. The method includes: A terminal receives first indication information, where the first indication information is used to indicate a time domain position at which second indication information is monitored; and the terminal receives the second indication information, where the second indication information includes information about a channel occupancy time of a network device and/or slot format information of one or more slots corresponding to the channel occupancy time.

The terminal may learn a flexible start/end position of the channel occupancy time by using the first indication information and the second indication information, so that blind detection overheads can be reduced.

In a possible design, the terminal receives an initial downlink signal in a portion of sub-bands in a plurality of sub-bands, and the terminal receives the second indication information in one sub-band in the portion of sub-bands.

In a possible design, the first indication information is a bit sequence, and a bit in the bit sequence is in a one-to-one correspondence with a symbol in one slot, where when the bit in the bit sequence is a first value, it indicates that the second indication information is monitored on the symbol corresponding to the bit, and when the bit in the bit sequence is a second value, it indicates that the second indication information is not monitored on the symbol corresponding to the bit.

In a possible design, the first indication information includes time domain position information of the initial downlink signal.

In a possible design, the time domain position indicated by the first indication information includes another symbol other than first three symbols in one slot.

In a possible design, a last slot in the one or more slots includes a plurality of consecutive symbols used for transmission interruption or flexible transmission, and a symbol preceding a first symbol n the plurality of consecutive symbols used for transmission interruption or flexible transmission is an end symbol of the channel occupancy time.

In a possible design, the plurality of consecutive symbols used for transmission interruption or flexible transmission are located at the tail of the last slot in the one or more slots.

In a possible design, a first slot and the last slot in the one or more slots have a same slot format.

In a possible design, the slot format information of the one or more slots corresponding to the channel occupancy time does not include slot format information of the last slot in the one or more slots.

In a possible design, the second indication information is downlink control information.

According to a second aspect, an embodiment of this application provides an indication information transmission method. The method includes: A network device sends first indication information, where the first indication information is used to indicate a time domain position at which second indication information is monitored; and the network device sends the second indication information, where the second indication information includes information about a channel occupancy time of the network device and/or slot format information of one or more slots corresponding to the channel occupancy time.

In a possible design, the network device sends an initial downlink signal in a portion of sub-bands in a plurality of sub-bands, and the network device sends the second indication information in one sub-band in the portion of sub-bands.

In a possible design, the first indication information is a bit sequence, and a bit in the bit sequence is in a one-to-one correspondence with a symbol in one slot, where when the bit in the bit sequence is a first value, it indicates that the second indication information is monitored on the symbol corresponding to the bit, and when the bit in the bit sequence is a second value, it indicates that the second indication information is not monitored on the symbol corresponding to the bit.

In a possible design, the first indication information includes time domain position information of the initial downlink signal.

In a possible design, the time domain position indicated by the first indication information includes another symbol other than first three symbols in one slot.

In a possible design, a last slot in the one or more slots includes a plurality of consecutive symbols used for transmission interruption or flexible transmission, and a symbol preceding a first symbol in the plurality of consecutive symbols used for transmission interruption or flexible transmission is an end symbol of the channel occupancy time.

In a possible design, the plurality of consecutive symbols used for transmission interruption or flexible transmission are located at the tail of the last slot in the one or more slots.

In a possible design, a first slot and the last slot in the one or more slots have a same slot format.

In a possible design, the slot format information of the one or more slots corresponding to the channel occupancy time does not include slot format information of the last slot in the one or more slots.

In a possible design, the second indication information is downlink control information.

According to a third aspect, an indication information transmission apparatus is provided. The apparatus includes modules configured to perform the method in any one of the first aspect or the possible implementations of the first aspect, or modules configured to perform the method in any one of the second aspect or the possible implementations of the second aspect. For example, the apparatus includes a receiving module and/or a sending module.

According to a fourth aspect, a communications apparatus is provided. The communications apparatus may be the network device or the terminal in the foregoing method designs, or may be a chip disposed in the network device or the terminal. The communications apparatus includes a processor that is coupled to a memory, and the processor may be configured to execute instructions in the memory, to implement the method performed by a first node in any one of the first aspect or the possible implementations of the first aspect. Optionally, the communications apparatus further includes the memory. Optionally, the communications apparatus further includes a communications interface, and the processor is coupled to the communications interface.

When the communications apparatus is the network device or the terminal, the communications interface may be a transceiver or an input/output interface.

When the communications apparatus is the chip disposed in the network device or the terminal, the communications interface may be the input/output interface.

Optionally, the transceiver may be a transceiver circuit. Optionally, the input/output interface may be an input/output circuit.

According to a fifth aspect, an embodiment of this application provides a communications system. The communications system includes a network device or a terminal.

According to a sixth aspect, an embodiment of this application provides a chip. The chip is connected to a memory, and is configured to read and execute a software program stored in the memory, to implement the method according to any one of the first aspect and the second aspect, or any design of the first aspect and the second aspect.

According to a seventh aspect, an embodiment of this application provides a chip. The chip includes a processor and a memory. The processor is configured to read a software program stored in the memory, to implement the method according to any one of the first aspect and the second aspect, or any design of the first aspect and the second aspect.

According to an eighth aspect, an embodiment of this application further provides a computer-readable storage medium. The computer-readable storage medium is configured to store computer software instructions used for performing a function according to any one of the first aspect to the third aspect, or any design of the first aspect to the third aspect. The computer software instructions include a program designed for performing any one of the first aspect and the second aspect, or any design of the first aspect and the second aspect.

According to a ninth aspect, an embodiment of this application provides a computer program product including an instruction. When the computer program product runs on a computer, the computer is enabled to perform the method according to any one of the first aspect and the second aspect, or any design of the first aspect and the second aspect.

DESCRIPTION OF EMBODIMENTS

The embodiments of this application may be used in a communications system, for example, a wireless communications system. A method provided in the embodiments of this application may be used, provided that an entity in the communications system needs to indicate or send a channel occupancy time (channel occupancy time, COT) format. Specifically, the communications system includes hut is not limited to communications systems such as a long term evolution (long term evolution, LTE) system, a long term evolution-advanced (long term evolution-advanced, LTE-A) system, a new radio (new radio, NR) system, or a 5G (5th generation) system, and the communications system may also include systems such as a wireless fidelity (wireless fidelity, WiFi) system and a worldwide interoperability for microwave access (worldwide interoperability for microwave access, wimax) system.

Figure 1:
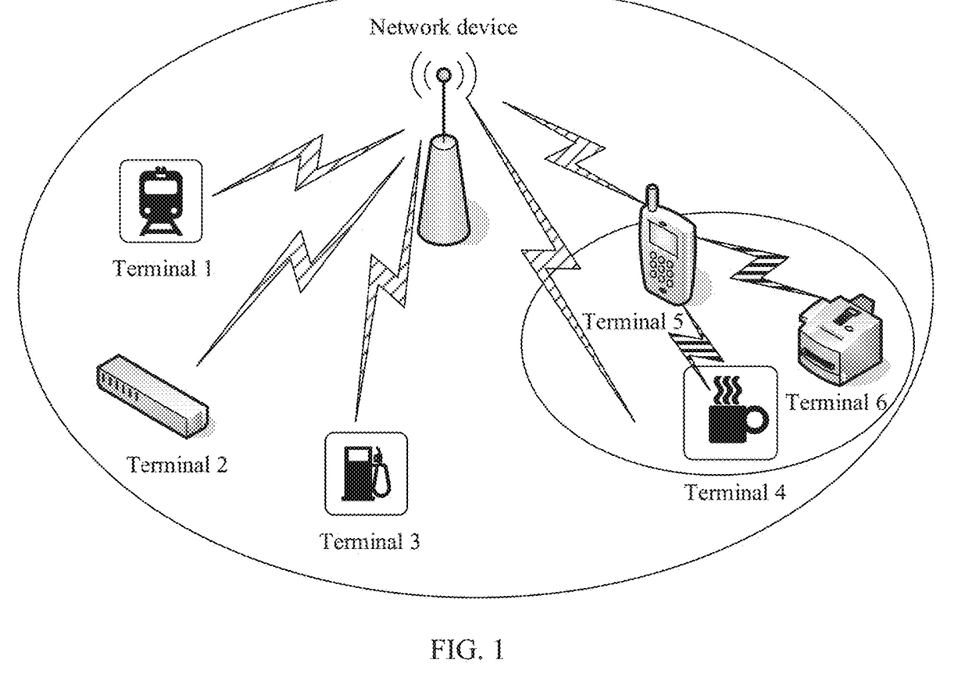
FIG. 1 is a schematic diagram of a communications system in which an embodiment of this application is used.

FIG. 1 is a schematic diagram of a communications system in which an embodiment of this application is used. As shown in FIG. 1, the communications system includes a network device and a terminal 1 to a terminal 6. In the communications system, the terminal 1 to the terminal 6 may send uplink data to the network device. The network device receives the uplink data sent by the terminal 1 to the terminal 6. In addition, a terminal 4 to the terminal 6 may alternatively form a sub-communications system. In the communications system, a BS may send downlink data to the terminal 1, a terminal 2, a terminal 5, and the like. The terminal 5 may alternatively send downlink data to the terminal 4 and the terminal 6. The BS may receive uplink data sent by the terminal I, the terminal 2, the terminal 5, and the like. The terminal 5 may alternatively receive uplink data sent by the terminal 4 and the terminal 6.

The network device may be a base station (for example, a NodeB or an eNB) in a 2G, a 3G, or an LTE system, a new radio controller (new radio controller, NR controller), a gNodeB (gNB) in a 5G system, a centralized unit (centralized unit), a new radio base station, a remote radio unit, a micro base station, a distributed unit (distributed unit), a transmission reception point (transmission reception point, TRP), a transmission point (transmission point, TP), or any other radio access device. This is not limited in this embodiment of this application.

The terminal may be a device that has a function of communicating with the network device and a relay node, or may be a device that provides a user with voice and/or data connectivity. For example, the terminal may be a handheld device or a vehicle-mounted device that has a wireless connection function. A common terminal includes: for example, a mobile phone, a tablet, a notebook computer, a palmtop computer, a mobile internet device (mobile interne device, MID), and a wearable device such as a smartwatch, a smart band, or a pedometer. The terminal may also be referred to as user equipment (user equipment, UE).

When communication is performed in an unlicensed band (unlicensed band), a time domain start position or a time domain end position at which the network device occupies a channel is relatively flexible. The network device sends and/or receives data within a time domain range of the channel occupied by the network device. The time domain range of the channel occupied by the network device may be considered as a channel occupancy time of the network device. The network device may communicate with the terminal within the channel occupancy time. The channel occupancy time may be represented by a COT.

Figure 2:
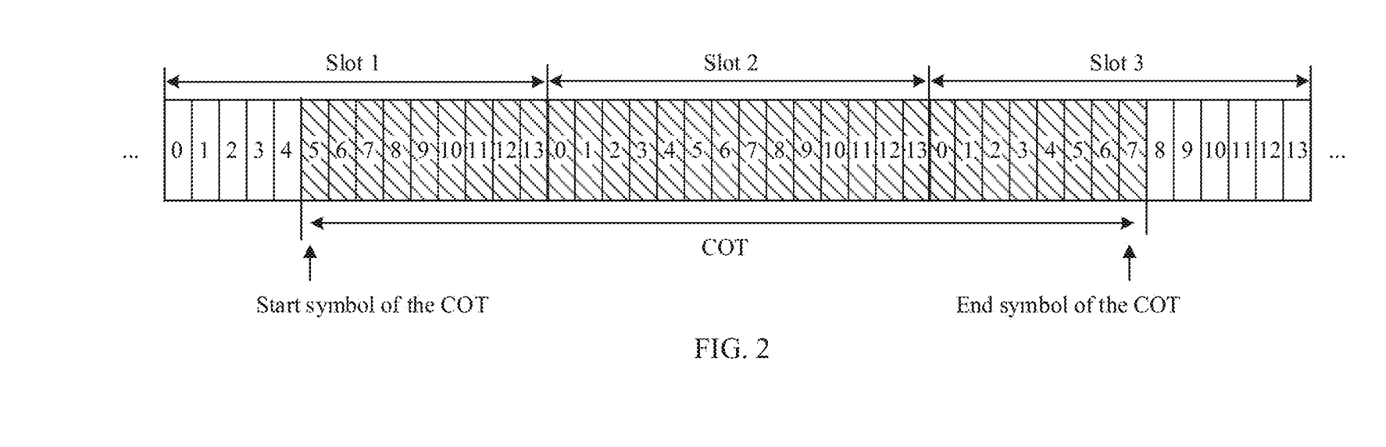
FIG. 2 is a schematic diagram of a channel occupancy time.

FIG. 2 is a schematic diagram of a channel occupancy time. A start position of the channel occupancy time obtained by a network device may not be a start position of a slot, but may be any position in a slot. As shown in FIG. 2, there are a plurality of slots in time domain, and there are 14 symbols in each slot. A COT may start from a symbol 5 in a slot 1. The COT may end in a symbol 7 in a slot 3. The symbol 5 in the slot 1 may be referred to as a start symbol of the COT, and the symbol 7 in the slot 3 may be referred to as an end symbol of the COT. Certainly, a start position of the COT may be considered as an end position of a symbol 4 in the slot 1 or a start position of the symbol 5 in the slot 1. An end position of the COT may be considered as an end position of the symbol 7 in the slot 3 or a start position of a symbol 8 in the slot 3.

The slots 1 to 3 in FIG. 2 may be considered as slots corresponding to the COT. In other words, one or more slots included in the COT may be considered as the slots corresponding to the COT.

If a terminal covered by the network device needs to use the COT obtained by the network device, the terminal needs to obtain configuration information of a search space set. The search space set includes a set of time domain positions at which the terminal performs downlink control information (downlink control information, DCI) monitoring. These time domain positions may be referred to as a monitoring occasion (Monitoring Occasion). The configuration information of the search space set includes at least one of the following information: format information of the DCI used to carry slot format information, monitoring occasion information of the search space set, or the like.

The DCI may carry a slot format of one or more consecutive slots in time domain. A format of the DCI may be a DCI format 2_0). Table 1 shows a plurality of slot formats. Each format number in Table 1 corresponds to one slot format. If there are 14 OFDM symbols in one slat, an OFDM symbol in each slot may be used for uplink transmission, or may be used for downlink transmission. In some cases, these OFDM symbols may also he in a state in which the uplink transmission may be performed and the downlink transmission may be performed, or in a state in which no transmission is performed temporarily.

TABLE 1

Table of a plurality of slot formats

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | ... | ... | ... | ... | ... | ... | ... | ... | ... | ... | ... | ... | ... | ... |

In Table 1, U represents an OFDM symbol used for uplink transmission, D represents an OFDM symbol used for downlink transmission, and F represents an OFDM symbol used for flexible transmission.

If the type of the OFDM symbol is F, the OFDM symbol is used for uplink transmission and/or downlink transmission. Scheduling information includes downlink control information (DCI, Downlink Control Information) for scheduling uplink data and; or downlink data. Specifically, there may he the following several manners of processing the OFDM symbol whose type is F.

1. If UE receives slot format indicator information of SFI, and learns that the type of the OFDM symbol in the slot is F, before receiving UL scheduling and/or DL scheduling, the UE does not send or receive data and/or a signal on the OFDM symbol whose type is F.
2. If UF, receives slot format indicator information of SFI and learns that the type of the OFDM symbol in the slot is F, the UE receives UI, scheduling information, and the UL scheduling information indicates the UE to send data and/or a signal on the OFDM symbol whose type is F, the UE sends, based on the UL scheduling information, the data and/or signal on the OFDM symbol whose type is F.
3. If UE receives slot format indicator information of SFI and learns that the type of the OFDM symbol in the slot is F, the UE receives DL scheduling information, and the DL scheduling information indicates the UE to receive data and/or a signal on the OFDM symbol whose type is F, the UE receives, based on the DL scheduling information, the data and/or signal on the OFDM symbol whose type is F.
4. (Optional) if UE receives slot format indicator information of SFI, and learns that the type of the OFDM symbol in the slot is F, the UF, does not expect to receive both DL scheduling information and UL scheduling information, and the two types of scheduling information are used to indicate the UE to receive and send data and/or a signal on the same OFDM symbol.

For a slot 2 in FIG. 2, the terminal may perform the DCI monitoring on first three OFDM symbols in the slot 2. In other words, the monitoring occasion of the search space set of the terminal includes first three OFDM symbols in one slot. The first three OFDM symbols are three OFDM symbols located at the slot head in the slot.

For example, when a control resource set (control resource set, CORESET) configured for the terminal by the network device includes one OFDM symbol in time domain, a monitoring occasion of a search space set associated with the CORESET may be one or more of OFDM symbols {0} and {2}. Correspondingly, the terminal may monitor the DCI at the monitoring occasion.

Alternatively, if the CORESET includes two OFDM symbols in time domain, the monitoring occasion of the search space set associated with the CORESET may be one of OFDM symbols {0, 1}, and {1, 2}. Correspondingly, the terminal may monitor the DCI at the monitoring occasion.

Alternatively, if the CORESET includes three OFDM symbols in time domain, the monitoring occasion of the search space set associated with the CORESET may be OFDM symbols {0, 1, 2}. Correspondingly, the terminal may monitor the DCI at the monitoring occasion.

For the slot 1 in FIG. 2, the terminal needs to perform the DCI monitoring near the start position of the COT. In other words, the search space set of the terminal should further include the OFDM symbol near the start position of the COT, for example, the symbol 5 or the symbol 6 in the slot 1. For the slot 3 in FIG. 2, the terminal may perform the DCI monitoring on first three OFDM symbols in the slot 3, or may directly determine a slot format of the slot 3 based on the slot format obtained through the DCI monitoring in another slot in the COT. For example, the terminal detects the DCI at the start position of the COT in the slot 1. The terminal determines the slot format information of the COT (for example, symbols 5 to 13) in the slot 1 based on the slot format information carried in the DCI. In this case, the slot format of the slot 3 may be consistent with the slot format obtained through the DCI monitoring in the slot 1.

Therefore, the network device needs to perform proper configuration or indication for the COT with a relatively flexible time domain start position and end position in FIG. 2, so that the terminal can learn of an available COT.

Figure 3:
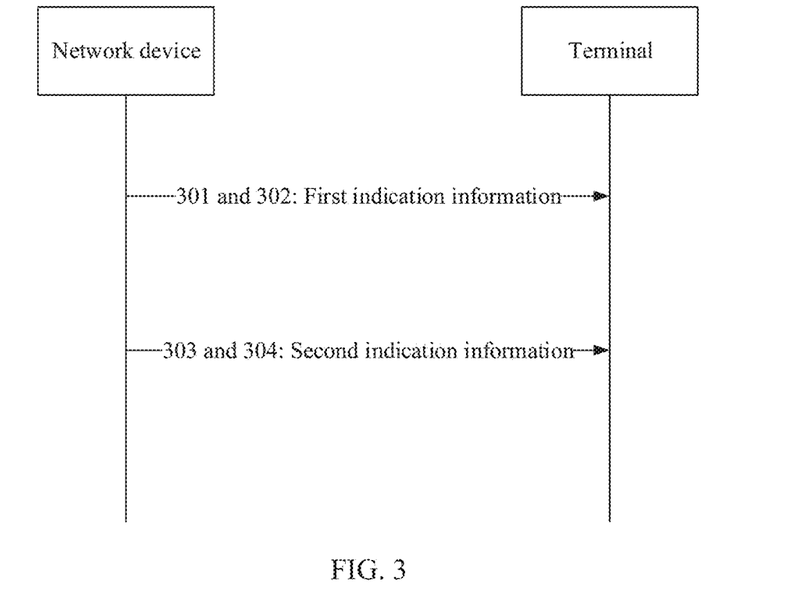
FIG. 3 is a schematic diagram of an indication information transmission method according to an embodiment of this application.

FIG. 3 is a schematic diagram of an indication information transmission method according to an embodiment of this application. As shown in FIG. 3, the method includes the following steps, Step 301: A network device sends second indication information.

The second indication information includes information about a COT of the network device and/or slot format information of one or more slots corresponding to the COT.

Step 302: A terminal receives the second indication information.

The terminal may learn of an available COT based on the second indication information. The terminal may learn of a slot format of a slot corresponding to the COT, or the terminal may learn of a type of a symbol in the COT. The terminal communicates with the network device on the COT.

Usually, the second indication information may be downlink control information. Alternatively, usually, the second indication information may be carried by the DCI. In this case, the network device needs to notify the terminal of positions at which the DCI is monitored. Therefore, the method shown in FIG. 3 further includes the following steps.

Step 303: The network device sends first indication information. The first indication information is used to indicate a time domain position at which the second indication information is monitored.

Step 304: The terminal receives the first indication information.

The terminal determines, based on the first indication information, the position at which the second indication information is monitored. The terminal monitors the second indication information at the corresponding position, For a case of a flexible start position of the COT, according to the method provided in this embodiment of this application, a type of an OFDM symbol in a slot may be obtained through the DCI monitoring. In particular, types of some OFDM symbols in a first slot corresponding to the COT may be obtained, or in particular, types of some OFDM symbols in a last slot corresponding to the COT may be obtained.

The following further describes the method provided in this embodiment of this application with reference to the accompanying drawings.

The second indication information is used to indicate an available time domain resource. The available time domain resource includes one or more slots. The second indication information further includes the slot format information of the one or more slots. A type of an OFDM symbol in a first slot in the available time domain resource is consistent with a type of a corresponding OFDM symbol in a last slot in the available time domain resource. Alternatively, a slot format of the first slot in the available time domain resource is consistent with a slot format of the last slot in the available time domain resource, Alternatively, the type of the OFDM symbol in the last slot in the available time domain resource is the type of the corresponding OFDM symbol in the first slot.

Types of OFDM symbols may include the following several types: an OFDM symbol used for uplink transmission (for example, an OFDM symbol whose type is U in Table 1), an OFDM symbol used for downlink transmission (for example, an OFDM symbol whose type is D in Table 1), an OFDM symbol used for flexible transmission (for example, an OFDM symbol whose type is F in Table 1), and an OFDM symbol in an interrupted state. The OFDM symbol in the interrupted state indicates that the OFDM symbol may be shared with another device; or for a device that obtains a right to use the OFDM symbol, transmission is not performed, or transmission is interrupted. Therefore, the OFDM symbol may also be referred to as an OFDM symbol used for transmission interruption (or an OFDM symbol used for shared transmission), and P may be used to represent the type of the OFDM symbol.

The second indication information may indicate a type of an OFDM symbol in one or more slots. The terminal sends and/or receives data or a signal based on the type of the OFDM symbol in the one or more slots. In a possible implementation, the network device may use DCI format 2_0 to carry the second indication information. The terminal obtains the slot format of the one or more slots or the type of the OFDM symbol in the one or more slots based on the DCI that carries the second indication information.

The time domain position indicated by the first indication information includes another symbol other than first three symbols in one slot. Specifically, the terminal may monitor the DCI on an OFDM symbol other than the first three OFDM symbols in one slot, to obtain the second indication information. The terminal may need to obtain numbers of the first OFDM symbol of a control resource set associated with a search space set of the terminal in one slot, to monitor the DCI at positions corresponding to the numbers. A slot 2 in FIG. 2 is used as an example. If the control resource set associated with the search space set of the terminal includes one or more consecutive OFDM symbols in time domain, for example, symbols 0 and 1 and symbols 5 and 6 in FIG. 2, In this case, the numbers of the first OFDM symbol of the control resource set of the terminal in the slot 2 are the symbol 0 and the symbol 5.

In a possible implementation, the first indication information is a bit sequence, and a bit in the bit sequence is in a one-to-one correspondence with a symbol in one slot, where when the bit in the bit sequence is a first value, it indicates that the second indication information is monitored on the symbol corresponding to the bit, and when the bit in the bit sequence is a second value, it indicates that the second indication information is not monitored on the symbol corresponding to the bit.

For example, a number or position information of an OFDM symbol that needs to be monitored in one slot may be indicated by a 14-bit binary bit sequence. The most significant bit in the 14-bit sequence corresponds to the first OFDM symbol in the slot, namely, the symbol 0. A correspondence between another bit in the 14-bit bit sequence and an OFDM symbol in one slot is obtained by analogy. When a quantity of OFDM symbols in one slot is less than 14, first 12 bits of the 14-bit bit sequence are used for correspondence. Specifically, there may be the following implementations.

A. If one slot includes 14 OFDM symbols, the least significant bit of the 14 bits is corresponding to the last OFDM symbol in the slot, 14 is a bit with a value of 1 in the bits, and is used to indicate that the OFDM symbol in the slot corresponding to the bit is a position, in the slot, of the first OFDM symbol of the control resource set associated with the search space. For example, the 14-bit bit sequence is {0 0 0 0 0 1 0 0 0 0 0 0 0 0}, and each bit is corresponding to symbols 0 to 13 in one slot. If a CORESET associated with the search space needs to occupy two consecutive OFDM symbols, the terminal checks whether a position of the DCI is a sixth OFDM symbol and a seventh OFDM symbol in a slat corresponding to the bit sequence.

B. If one slot includes 12 OFDM symbols, the least significant bit of the 12 bits is corresponding to the last OFDM symbol in the slot. 14 is a bit with a value of 1 in the bits, and is used to indicate that the OFDM symbol in the slot corresponding to the bit is a position, in the slot, of the first OFDM symbol of the control resource set associated with the search space. Optionally, values of the $13^{th}$ bit and the $14^{th}$ bit in the 14-bit bit sequence are 0. For example, the 14-bit bit sequence is {0 0 0 0 0 1 0 0 0 0 0 0 0 0}, and {0 0 0 0 0 1 0 0 0 0 0 0} is corresponding to symbols 0 to 11 in one slot. If the CORESET associated with the search space occupies two consecutive OFDM symbols in time domain, the terminal checks whether a position of the DCI is a sixth OFDM symbol and a seventh OFDM symbol in a slot.

In another possible implementation, an initial downlink signal (initial downlink signal) sent by the network device may be used to indicate the position at which the terminal monitors the second indication information, Optionally, the network device sends the downlink control information at the time domain position of the initial downlink signal. Alternatively, the time domain position at which the terminal monitors the downlink control information is a time domain position at which the initial downlink signal is detected.

For example, the terminal monitors an initial downlink signal at a time domain position at which OFDM symbol numbers in a slot are {0, 2, 4, 6, 8, 10, 12}. If the terminal detects time initial downlink signal at the position of the OFDM symbol {4}, the terminal monitors the downlink control information on the OFDM symbol {4}. Further, optionally, if the CORESET configured by the terminal includes two OFDM symbols, the terminal monitors the downlink control information on OFDM symbols whose numbers are {4, 5}.

Optionally, when the first indication information is a bit sequence, the bit sequence may, be used to indicate that the time domain position at which the downlink control information is monitored is the time domain position at which the initial downlink signal is detected.

For example, the first indication information includes the 14-bit bit sequence. When a value of each bit in the 14-bit bit sequence is 1, the time domain position at which the downlink control information is monitored is the time domain position at which the initial downlink signal is detected. That the terminal determines the time domain position at which the downlink control information is monitored is described above. Details are not described herein again.

Optionally, there is an offset between the time domain position at which the network device sends the initial downlink signal and the time domain position at which the network device sends the downlink control information. The time domain offset may be a predefined value, or may be configured by using a higher-layer parameter. The terminal may monitor the second indication information on an $M^{th}$ symbol after the position at which the initial downlink signal is detected. M may be a predefined value.

For example, the terminal obtains a predefined time domain offset or a time domain offset configured by using a higher layer parameter, where the time domain offset is four OFDM symbols, and the terminal detects an initial downlink signal at a time domain position whose OFDM symbol number is {4}. The time domain position at which the terminal monitors the downlink control information is a time domain position whose OFDM symbol number is {8} in a same slot.

The initial downlink signal may be one or more of the following signals: a physical downlink control channel demodulation reference signal (PDCCH DMRS), a physical broadcast channel demodulation reference signal (PBCH DMRS), a primary synchronization signal (PSS), a secondary synchronization signal (SSS), a channel state information reference signal (CSI-RS), and a time-frequency tracking reference signal (Tracking-RS, TRS)

In a possible implementation, the network device sends configuration information of the initial downlink signal, where the configuration information includes a slot number for the initial downlink signal monitoring and/or a position of an OFDM symbol in the slot number. The network device may configure a type of an OFDM symbol in a slot by using broadcast information (for example, system information) and/or dedicated RRC signaling (Dedicated RRC signaling). Types of OFDM symbols include U, D, and F.

The terminal may monitor the initial downlink signal on the OFDM symbol whose type is D or F.

For example, the network device may configure a type of an OFDM symbol in a slot 0 by using the broadcast information and/or the dedicated RRC signaling, as shown in Table 2.

TABLE 2

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | F | F | F | F | U | U  | U  | U  | U  |

The time domain position at which the terminal monitors the initial downlink signal is shown in Table 3:

TABLE 3

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| √ | — | √ | — | √ | — | √ | — | √ | — | √  | —  | √  | —  |

In this case, the terminal monitors the initial downlink signal only at a position at which OFDM symbol numbers are {0, 2, 4, 6, 8}.

Optionally, the terminal does not expect to monitor the initial downlink signal on the OFDM symbol whose type is U.

For example, the network device may configure a type of an OFDM symbol in a slot 0 by using the broadcast information and/or the dedicated RRC signaling, as shown in the following Table.

TABLE 4

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | F | F | F | F | U | U  | U  | U  | U  |

The initial downlink signal monitored by the terminal includes two consecutive OFDM symbols in time domain. In addition, positions of start OFDM symbols of the initial downlink signal are shown in Table 5.

TABLE 5

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| √ |   | √ |   | √ |   | √ |   | √ | √ | √  |    |    |    |

In this case, the terminal monitors the initial downlink signal only at a start position at which OFDM symbol numbers are {2, 4, 6}. The reason why the OFDM symbol whose start symbol is numbered 8 is removed is that a symbol 9 is an OFDM symbol used for uplink transmission, and the UE does not expect to monitor an initial downlink signal in the symbol 9.

Optionally, the terminal does not expect to monitor the initial downlink signal on the following OFDM symbols: an OFDM symbol whose type is U, or an OFDM symbol whose distance from the OFDM symbol whose type is U is less than a preset value N. The preset value N is used to represent a time interval at which the terminal performs uplink-downlink switching.

For example, a value of a network device configuration parameter N is 3. In addition, the network device configures a type of an OFDM symbol in a slot 0 by using the broadcast information and/or the dedicated RRC signaling, as shown in Table 6.

TABLE 6

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | F | F | F | F | U | U  | U  | U  | U  |

The initial downlink signal monitored by the terminal includes two consecutive OFDM symbols in time domain. In addition, positions of start OFDM symbols of the initial downlink signal are shown in Table 7.

TABLE 7

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| √ |   | √ |   | √ |   | √ |   | √ | √ |    |    |    |    |

In this case, the terminal monitors the initial downlink signal only at a start position at which OFDM symbol numbers are {0, 2, 4}. The reason why the OFDM symbol numbered 8 is removed is that the symbol 9 is an OFDM symbol used for uplink transmission, and the UE does not expect to monitor an initial downlink signal. In addition, the reason why the OFDM symbol numbered 6 is removed is that the distance between the symbol 6 and the symbol 9 used for the uplink transmission is only two OFDM symbols, which are less than the preset value N.

The first indication information may indicate slot formats of some slots in the COT. In other words, a quantity of slots indicated by the first indication information may be less than a quantity of slots included in the COT.

In a possible implementation, the quantity of slots indicated by the first indication information is equal to a quantity of time domain resources included in the COT. For example, if the indication information carried in the DCI format 2_0 indicates five consecutive slot formats in time domain, the COT includes five slots. A start slot of the COT is a slot in which the DCI format 2_0 is detected. If the UE detects the DCI format 2_0 in a slot 0, and the DCI format 2_0 indicates five slots, the start slot of the COT is the slot 0, and an end slot of the COT is a slot 4.

In another possible implementation, a quantity of slots indicated by the second indication information is less than a quantity of slots included in the COT. For example, if the DCI indicates that the quantity of slots is five slots, the quantity of OFDM symbols in the COT is less than the quantity of OFDM symbols included in the quantity of slots indicated by the DCI. Further, if the indication information carried in the DCI indicates four consecutive slot formats in time domain, the time domain resource included in the COT includes at least resources of five slots. A start slot of the COT is a slot in which the DCI format 2_0 is detected. If the UE detects the DCI in the slot 0, and the DCI indicates four slots, the COT includes at least all or some OFDM symbols in the slot 0, the slot 1, the slot 2, the slot 3, and the slot 4.

Optionally, the second indication information includes SFI. The SFI may indicate a slot format of a plurality of slots, A slot format of the first slot corresponding to the COT is consistent with a slot format of the first slot indicated by the SFI. In the following description, the first slot corresponding to the COT is referred to as the first slot of the COT for short.

For example, types of OFDM symbols in the first slot indicated by the SFI are shown in Table 8.

TABLE 8

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | F | F | F | F | U | U  | U  | U  | U  |

If the first slot of the COT starts only from the fifth OFDM symbol, types that are of OFDM symbols in the first slot of the COT and that are determined by the terminal are shown in Table 9.

TABLE 9

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| <N> | <N> | <N> | <N> | <N> | F | F | F | F | U | U | U | U | U |

In other words, the type of the OFDM symbol in the first slot of the COT is determined, starting from the start symbol of the COT, based on the indication of the SFI.

A slot format of the last slot of the COT may be the same as the slot format of the first slot. If the last slot of the COT occupies only first five OFDM symbols of the slot, types of OFDM symbols in the last slot in the COT are shown in Table 10.

TABLE 10

| 1 | 2 | 3 | 4 | 5 | 6 | 7 | 8 | 9 | 10 | 11 | 12 | 13 |
|---|---|---|---|---|---|---|---|---|----|----|----|----|
| D | D | D | D | D | <N> | <N> | <N> | <N> | <N> | <N> | <N> | <N> |

The slot format of the last slot of the COT may be the same as the slot format of the first slot, as shown in Table 8. If the first slot in which the COT is located occupies 10 OFDM symbols at the tail of the slot, and the last slot of the COT occupies only six OFDM symbols at the head of the slot, the format of the first slat in one or more slots corresponding to the COT may be shown in Table 11.

TABLE 11

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| <N> | <N> | <N> | <N> | D | F | F | F | F | U | U | U | U | U |

In this case, a format of the last slot in which the COT is located may be shown in Table 12.

TABLE 12

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | F | <N> | <N> | <N> | <N> | <N> | <N> | <N> | <N> |

One slot corresponding to the COT includes a plurality of consecutive symbols used for transmission interruption or flexible transmission, and a symbol preceding a first symbol in the plurality of consecutive symbols used for transmission interruption or flexible transmission is an end symbol of the COT. Optionally, the plurality of consecutive symbols used for transmission interruption or flexible transmission are located at the tail of the slot.

For example, the network device may indicate an end position of the COT by using an OFDM symbol whose type is P. When detecting that the OFDM whose type is P, the terminal may consider that the current COT ends.

First, the OFDM symbol whose type is P may have the following application manners:

1. If the UE receives the SFI, and learns that the type of the OFDM symbol in the slot is P, the UE does not expect to receive DL scheduling information and/or UL scheduling information, and indicates that the OFDM symbol whose type is P is used to receive or send data or a signal.
2. If the LT receives higher layer signaling (including broadcast information and/or dedicated RRC signaling) for configuring the slot format, and learns that the type of the OFDM symbol is F or U, the UE may change the type of the OFDM symbol to P. In this case, the UE does not expect to send data or a signal on the OFDM symbol.
3. If the UE receives higher layer signaling (including broadcast information and/or dedicated RRC signaling) for configuring the slot format, and learns that the type of the OFDM symbol is D or F, the UE may change the type of the OFDM symbol to P. In this case, the UE monitors the initial downlink signal only on the OFDM symbol.

Similarly, the network device may also indicate the end position of the COT by using the OFDM symbol whose type is F.

In a possible implementation, the slot indicated by the second indication information includes a plurality of consecutive OFDM symbols whose types are F or P, and the plurality of consecutive OFDM symbols whose types are F or P are located at the tail of the slot. In this case, the plurality of consecutive OFDM symbols whose types are F or P may indicate the end position of the COT. The following describes, by using several slot formats indicated by the second indication information, how to determine the end position of the COT.

For example, slot formats indicated by the second indication information are shown in Table 13.

TABLE 13

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | D | D | D | F | F | F | F | F | F |

The slot shown in Table 13 ends with the plurality of consecutive OFDM symbols whose types are F. If numbers of the plurality of consecutive OFDM symbols whose types are F are {8, 9, 10, 11, 12, 13}, the symbol 8 may be used to indicate the end position of the COT. Specifically, the end position of the COT is an end position of the symbol 7 in the slot, a start position of the symbol 8 in the slot, or a boundary position of the symbol 7 and the symbol 8 in the slot.

Therefore, a previous OFDM symbol of the plurality of consecutive OFDM symbols whose types are F is the end symbol of the COT. The symbol 7 may be considered as the end symbol of the COT.

For example, slot formats indicated by the second indication information are shown in Table 14.

TABLE 14

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | D | D | D | P | P | P | P | P | P |

The slot shown in Table 14 ends with the plurality of consecutive OFDM symbols whose types are P. If numbers of the plurality of consecutive OFDM symbols whose types are P are {8, 9, 10, 11, 12, 13}, the symbol 8 may be used to indicate the end position of the COT. Specifically, the end position of the COT is an end position of the symbol 7 in the slot, a start position of the symbol 8 in the slot, or a boundary position of the symbol 7 and the symbol 8 in the slot.

Therefore, a previous OFDM symbol of the plurality of consecutive OFDM symbols whose types are P is the end symbol of the COT. The symbol 7 may be considered as the end symbol of the COT.

For example, slot formats indicated by the second indication information are shown in Table 15.

TABLE 15

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | F | F | F | F | F | U | D | D | F | F | F | F | F |

The slot shown in Table 15 ends with the plurality of consecutive OFDM symbols whose types are F. If numbers of the plurality of consecutive OFDM symbols whose types are F are {9, 10, 11, 12, 13}, the symbol 9 may be used to indicate the end position of the COT. Specifically, the end position of the COT is an end position of the symbol 8 in the slot, a start position of the symbol 9 in the slot, or a boundary position of the symbol 8 and the symbol 9 in the slot.

Therefore, a previous OFDM symbol of the plurality of consecutive OFDM symbols whose types are F is the end symbol of the COT. The symbol 8 may be considered as the end symbol of the COT.

It should be noted that, similar to the foregoing manner, the symbol 0 may also be used as the end symbol of the COT, Details are not described herein again.

For example, slot formats indicated by the second indication information are shown in Table 16.

TABLE 16

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| D | D | D | D | D | P | P | F | F | F | F | F | F | F |

The end symbol of the COT is the symbol 6. In other words, when both the plurality of consecutive OFDM symbols whose types are F and the plurality of consecutive OFDM symbols whose types are P exist, it may be agreed on that the plurality of consecutive OFDM symbols whose types are F or the plurality of consecutive OFDM symbols whose types are P are used as an end marker. Optionally, the terminal does not expect that a plurality of consecutive P are located after a plurality of consecutive F.

If the COT has a flexible end position, according to the method provided in this embodiment of this application, types of OFDM symbols in the slot may be obtained, and in particular, types of some OFDM symbols in the last slot corresponding to the COT may be obtained, to determine the end position of the COT.

In some scenarios, the network device configures a plurality of sub-bands for the terminal, and configures a control resource set in the plurality of sub-bands. To reduce blind detection complexity, the terminal monitors the DCI only in one of the plurality of sub-bands. The network device configures, for the terminal, one sub-band in which the DCI is monitored. When the terminal detects an initial downlink signal in the sub-band, the terminal continues to monitor the DCI in the sub-band.

Figure 4:
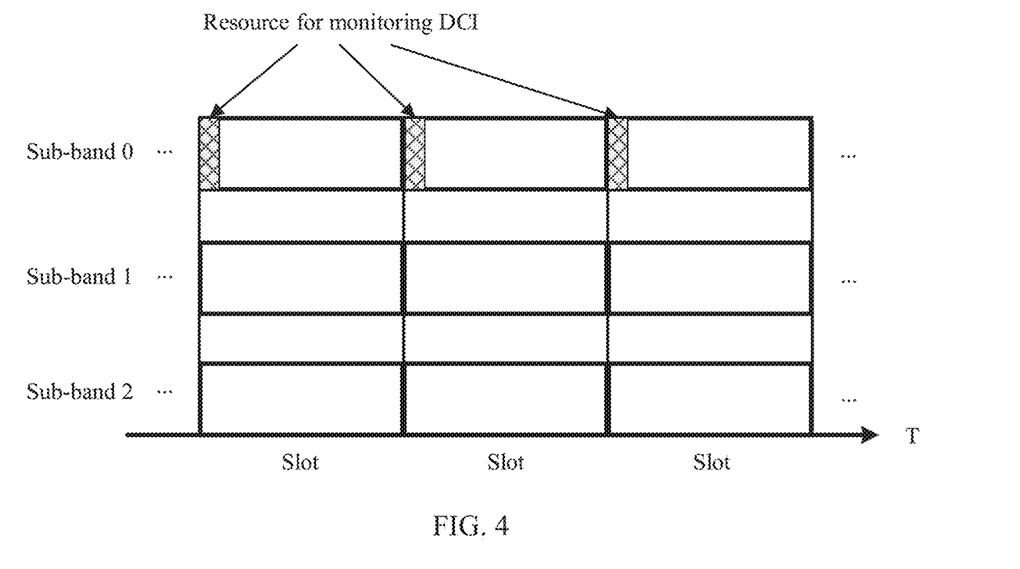
FIG. 4 is a schematic diagram for DCI monitoring.

FIG. 4 is a schematic diagram for DCI monitoring. As shown in FIG. 4, sub-bands configured for a terminal device by a network device include {sub-band 0, sub-band 1, sub-band 2}, and the DCI monitoring is configured in the sub-band 0. When detects an initial downlink signal in the sub-band 0, the terminal device continues to monitor DCI in the sub-band 0.

When the terminal does not detect the initial downlink signal in one of the plurality of sub-bands, in other words, the network device fails to perform LBT in the sub-band, the terminal cannot continue to monitor the DCI in the sub-band. In this case, the terminal needs to monitor DCI in another sub-band.

Specifically, if the terminal detects the initial downlink signal in a portion of sub-bands in the configured plurality of sub-bands, the terminal monitors the DCI in one sub-band in the portion of sub-bands.

Figure 5:
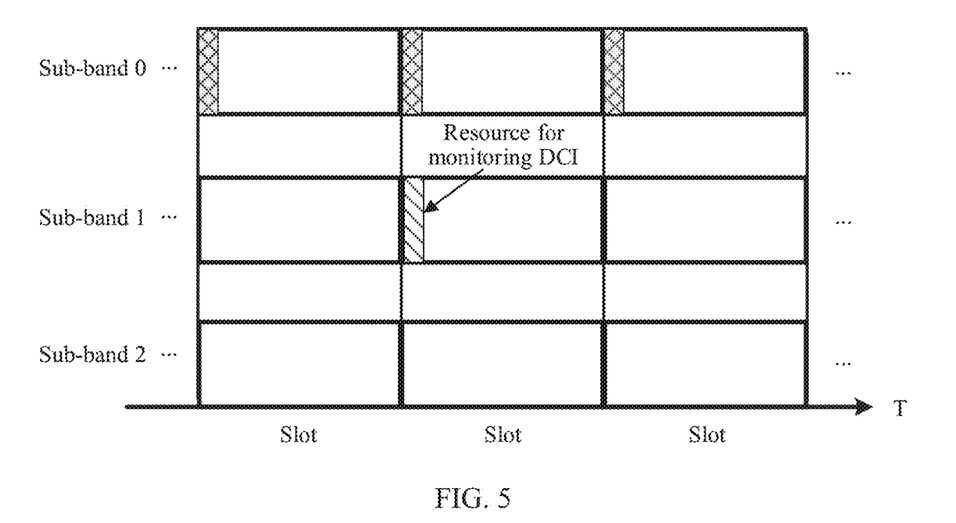
FIG. 5 is another schematic diagram for DCI monitoring.

FIG. 5 is another schematic diagram for DCI monitoring. As shown in FIG. 5, sub-bands configured for a terminal device by a network device include {sub-band 0, sub-band 1, sub-band 2,} and the terminal device detects an initial downlink signal in the configured {sub-band 1, sub-band 2}. Further, the terminal device monitors DCI only in the sub-band 1.

For example, the terminal obtains configuration information of a plurality of sub-bands, and a CORESET configured in each sub-band. The configuration information of the plurality of sub-bands includes sub-band numbers. The terminal may obtain, based on the sub-band numbers, sub-bands in which the terminal needs to monitor an initial downlink signal. The terminal needs to monitor the initial downlink signal in the sub-bands {0, 1, 2}. The configuration information is further used to indicate a sub-band in which the terminal monitors the DCI. For example, the terminal needs to monitor the DCI in the sub-band 1.

If the terminal detects the initial downlink signal in the sub-band 1 and the sub-band 2, the terminal selects only a sub-band with a smallest or largest number from the plurality of sub-band numbers as the sub-band for DCI monitoring; or the terminal selects, from a plurality of CORESETs in the sub-band with a smallest or largest number, a CORE-SET with a smallest number as the CORESET for DCI monitoring.

Optionally, sub-band information is carded in the initial downlink signal, and the sub-band information is used to indicate the sub-band in which the DCI is monitored. The sub-band information may he an initialization parameter for generating the initial downlink signal.

Optionally, the terminal device monitors the initial downlink signal in one or more sub-bands.

For example, the terminal device separately monitors the initial downlink signal in {sub-band 0, sub-band 1, sub-band 2}. The terminal device determines, based on a monitoring result, that sub-bands in which the initial downlink signal is detected include {sub-band 1, sub-band 2}.

It should be noted herein that the terminal device monitors the downlink control information or second indication information only in the sub-band in which the initial downlink signal is detected.

It should be noted that, in some cases, receiving the downlink control information is demodulating and decoding a received signal of a downlink control channel, to obtain the downlink control information. The downlink control information monitoring may be considered as receiving the signal of the downlink control Channel. However, the downlink control information monitoring does not mean that the downlink control information can surely be received.

The foregoing describes in detail the data transmission method according to the embodiments of this application with reference to FIG. 1 to FIG. 5. Based on a same inventive concept, the following describes data transmission apparatuses according to the embodiments of this application with reference to FIG. 6 to FIG. 8. It should be understood that the technical features described in the method embodiments are also applicable to the following apparatus embodiments.

Figure 6:
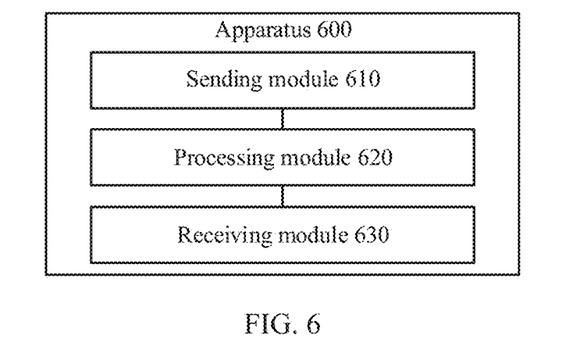
FIG. 6 is a schematic block diagram of a transmission apparatus 600 of indication information according to an embodiment of this application.

FIG. 6 shows a schematic block diagram of a transmission apparatus 600 of indication information according to an embodiment of this application. The apparatus 600 is configured to perform the method performed by the network device in the foregoing method embodiments. Optionally, a specific form of the apparatus 600 may be a base station or a chip in a base station. This is not limited in this embodiment of this application. The apparatus 600 includes a sending module 610.

The sending module 610 is configured to send first indication information and second indication information. The first indication information is used to indicate a time domain position at which the second indication information is monitored. The second indication information includes information about a channel occupancy time of a network device and/or slot format information of one or more slots corresponding to the channel occupancy time.

Further, the apparatus 600 may further include a processing module 620 and a receiving module 630. The receiving module 630 is configured to receive data. The processing module 620 is configured to process the received data and process to-be-sent data.

It should be noted that, for related features of the apparatus design shown in FIG. 6, refer to the foregoing method embodiments. Details are not described herein again.

Figure 7:
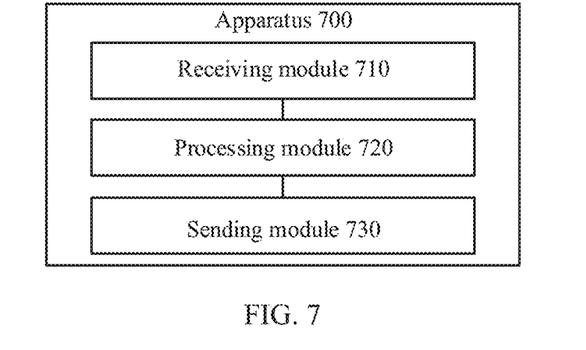
FIG. 7 is a schematic, block diagram of a transmission apparatus 700 of indication information according to an embodiment of this application.

FIG. 7 shows a schematic block diagram of a transmission apparatus 700 of indication information according to an embodiment of this application. The apparatus 700 is configured to perform the method performed by the terminal in the foregoing method embodiments, Optionally, a specific form of the apparatus 700 may be a terminal or a chip in a terminal. This is not limited in this embodiment of this application. The apparatus 700 includes a receiving module 710.

The receiving module 710 is configured to receive first indication information and second indication information. The first indication information is used to indicate a time domain position at which the second indication information is monitored. The second indication information includes information about a channel occupancy time of a network device and/or slot format information of one or more slots corresponding to the channel occupancy tune.

Further, the apparatus 700 may further include a processing module 720 or a sending module 730. The processing module 720 is configured to process received data and process to-be-sent data, for example, demodulating or decoding a received signal or received data. The sending module 730 is configured to send data.

It should be noted that, for related features of the apparatus design shown in FIG. 6, refer to the foregoing method embodiments. Details are not described herein again.

Figure 8:
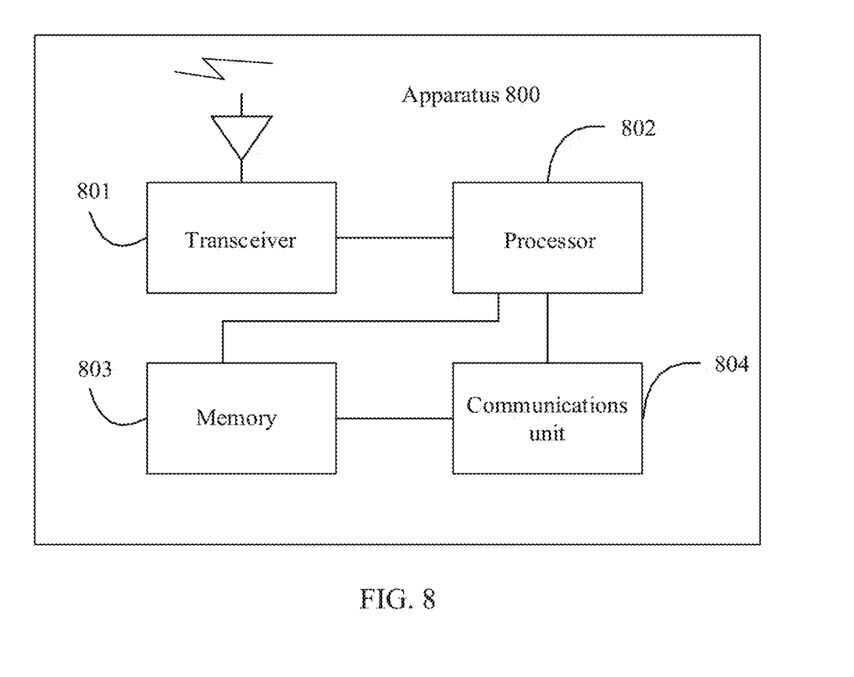
FIG. 8 is a schematic block diagram of a communications apparatus 800.

Based on a same inventive concept, an embodiment of this application further provides a communications apparatus 800. FIG. 8 shows a possible schematic structural diagram of a network device or a terminal in the foregoing method embodiments. The apparatus 800 may include a transceiver 801. The transceiver 801 may further include a receiver and a transmitter.

The transceiver 801 is configured to send or receive first indication information and second indication information. The first indication information is used to indicate a time domain position at which the second indication information is monitored. The second indication information includes information about a channel occupancy time of a network device and/or slot format information of one or more slots corresponding to the channel occupancy time.

It should be understood that, in some embodiments, the transceiver 801 nay be integrated by a transmitter and a receiver. In another embodiment, the transmitter and the receiver may alternatively be independent of each other.

Further, the apparatus 800 may further include a processor 802, a memory 803, and a communications unit 804. The transceiver 801, the processor 802, the memory 803, and the communications unit 804 are connected by using a bus.

On a downlink, the transceiver 801 adjusts output sampling of to-be-sent data (for example, a PDSCH) or signaling (for example a PDCCH) to generate a downlink signal. The downlink signal is transmitted through an antenna to the terminal in the above embodiment. On an uplink, the antenna receives an uplink signal transmitted by the terminal in the foregoing embodiments. The transceiver 801 adjusts the signal received from the antenna, and provides input sampling. In the processor 802, service data and a signaling message are processed, for example, modulating the to-be-sent data and generating an SC-FDMA symbol. These units perform processing based on a radio access technology (for example, an access technology in LTE, 5G, and another evolved system) used by a radio access network.

The processor 802 is further configured to control and manage the apparatus 800, to perform processing performed by the network device or the terminal in the foregoing method embodiments. Specifically, the processor 802 is configured to process received information and process to-be-sent information. In an example, the processor 802 is configured to support the apparatus 800 in performing the processing processes of the apparatus 800 in FIG. 2 to FIG. 5. When the method is used to an unlicensed scenario, the processor 802 further needs to control the apparatus 800 to perform channel listening, to transmit data or signaling. For example, the processor 802 performs, by using the transceiver 801, the channel listening on a signal received from the transceiver apparatus or the antenna, and controls the signal transmitted through the antenna to preempt a channel. In a different embodiment, the processor 802 may include one or more processors, for example, include one or more central processing units (Central Processing Unit, CPU). The processor 802 may be integrated into a chip, or may be a chip itself.

The memory 803 is configured to store related instructions and data, and program code and data that are of the apparatus 800. In a different embodiment, the memory 603 includes but is not limited to a random access memory (Random Access Memory, RAM), a read-only memory (Read-Only Memory, ROM), an erasable programmable read-only memory (Erasable Programmable Read Only Memory, EPROM), or a compact disc read-only memory (Compact Disc Read-Only Memory, CD-ROM). In this embodiment, the memory 803 is independent of the processor 802. In another embodiment, the memory 803 may be further integrated in the processor 802.

It should be noted that the apparatus 800 shown in FIG. 8 may be configured to perform the method performed by the network device or the terminal in the foregoing method embodiment. For implementations and technical effects that are not described in detail in the apparatus 800 shown in FIG. 8, refer to related descriptions in the foregoing method embodiments.

It may he understood that FIG, 8 shows only a simplified design of the network device or the terminal. In a different embodiment, the network device or the terminal may include any quantity of transmitters, receivers, processors, memories, and the like, and all network devices or terminals that can implement this application fall within the protection scope of this application.

An embodiment of this application provides a communication system. The communications system includes a network device and a terminal. The network device may be the communications apparatus shown in FIG. 6 or the apparatus shown in FIG. 8. The terminal may be the communications apparatus shown in FIG. 7 or the apparatus shown in FIG. 8.

Based on a same inventive concept, an embodiment of this application further provides a computer program product. The computer program product includes computer program code, and when the computer program code is run on a computer, the computer is enabled to perform the methods in the embodiments shown in FIG. 2 to FIG. 5.

Based on a same inventive concept, an embodiment of this application further provides a computer-readable medium. The computer-readable medium stores program code, and when the program code is run on a computer, the computer performs the methods in the embodiments shown in FIG. 2 to FIG. 5.

Based on a same inventive concept, an embodiment of this application further provides a chip. The chip may be a processor, configured to implement the methods in the foregoing method embodiments. Further, the chip is connected to a memory, and is configured to read and execute a software program stored in the memory, to implement the methods in the embodiments shown in FIG. 2 to FIG. 5.

Based on a same inventive concept, an embodiment of this application provides a chip. The chip includes a processor and a memory, and the processor is configured to read a software program stored in the memory, to implement the methods in the embodiments shown in FIG. 2 to FIG. 5.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may also be loaded onto a computer or other programmable data processing device, so that a series of operation steps are performed on the computer or other programmable device, thereby generating computer-implemented processing.

Clearly, a person skilled in the art can make various modifications and variations to this application without departing from the scope of this application. This application is intended to cover these modifications and variations of this application, provided that they fall within the scope of protection defined by the following claims and their equivalent technologies in this application.

All or some of the foregoing embodiments may be implemented by using software. hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. An indication information transmission method, wherein the method comprises:
    receiving, by a terminal, first indication information, wherein the first indication information indicates a time domain position at which second indication information is monitored, wherein the first indication information indicates whether the second indication information is monitored on a symbol position within a slot; and
    receiving, by the terminal, the second indication information, wherein the second indication information comprises at least one of information about a channel occupancy time of a network device or slot format information of one or more slots corresponding to the channel occupancy time.

2. The method according to claim 1, wherein:
the first indication information is a bit sequence, and a bit in the bit sequence is in a one-to-one correspondence with a symbol in one slot, and wherein if the bit in the bit sequence is a first value, the second indication information is monitored on the symbol corresponding to the bit, and if the bit in the bit sequence is a second value, the second indication information is not monitored on the symbol corresponding to the bit.

3. The method according to claim 1, wherein:
the first indication information comprises time domain position information of an initial downlink signal.

4. The method according to claim 1, wherein:
the time domain position indicated by the first indication information comprises another symbol other than first three symbols in one slot.

5. The method according to claim 1, wherein:
a last slot in the one or more slots comprises a plurality of consecutive symbols used for transmission interruption or flexible transmission, and wherein a symbol preceding a first symbol in the plurality of consecutive symbols used for transmission interruption or flexible transmission is an end symbol of the channel occupancy time.

6. The method according to claim 5, wherein:
the plurality of consecutive symbols used for transmission interruption or flexible transmission are located at a tail of the last slot in the one or more slots.

7. The method according to claim 6, wherein:
the slot format information of the one or more slots corresponding to the channel occupancy time does not comprise slot format information of the last slot in the one or more slots.

8. The method according to claim 1, wherein:
a first slot and a last slot in the one or more slots have a same slot format.

9. The method according to claim 1, wherein:
the terminal receives an initial downlink signal in a portion of sub-bands in a plurality of sub-bands; and
the terminal receives the second indication information in one sub-band in the portion of sub-bands.

10. The method according to claim 1, wherein:
the second indication information is downlink control information.

11. An indication information transmission method, wherein the method comprises:
    sending, by a network device, first indication information, wherein the first indication information indicates a time domain position at which second indication information is monitored, wherein the first indication information indicates whether the second indication information is monitored on a symbol position within a slot; and
    sending, by the network device, the second indication information, wherein the second indication information comprises at least one of information about a channel occupancy time of the network device or slot format information of one or more slots corresponding to the channel occupancy time.

12. The method according to claim 11, wherein:
the first indication information is a bit sequence, and a bit in the bit sequence is in a one-to-one correspondence with a symbol in one slot, and wherein if the bit in the bit sequence is a first value, the second indication information is monitored on the symbol corresponding to the bit, and if the bit in the bit sequence is a second value, the second indication information is not monitored on the symbol corresponding to the bit.

13. The method according to claim 11, wherein:
the first indication information comprises time domain position information of an initial downlink signal.

14. The method according to claim 11, wherein:
the time domain position indicated by the first indication information comprises another symbol other than first three symbols in one slot.

15. The method according to claim 11, wherein:
a last slot in the one or more slots comprises a plurality of consecutive symbols used for transmission interruption or flexible transmission, and wherein a symbol preceding a first symbol in the plurality of consecutive symbols used for transmission interruption or flexible transmission is an end symbol of the channel occupancy time.

16. The method according to claim 15, wherein:
the plurality of consecutive symbols used for transmission interruption or flexible transmission are located at a tail of the last slot in the one or more slots.

17. The method according to claim 16, wherein:
the slot format information of the one or more slots corresponding to the channel occupancy time does not comprise slot format information of the last slot in the one or more slots.

18. The method according to claim 11, wherein:
a first slot and a last slot in the one or more slots have a same slot format.

19. The method according to claim 11, wherein:
the network device sends an initial downlink signal in a portion of sub-bands in a plurality of sub-bands; and
the network device sends the second indication information in one sub-band in the portion of sub-bands.

20. A communication apparatus, comprising:
at least one processor; and
a non-transitory computer-readable storage medium coupled to the at least one processor and storing programming instructions for execution by the at least one processor, wherein the programming instructions instruct the at least one processor to cause the communication apparatus to perform:
receiving first indication information, wherein the first indication information indicates a time domain position at which second indication information is monitored, wherein the first indication information indicates whether the second indication information is monitored on a symbol position within a slot; and
receiving the second indication information, wherein the second indication information comprises at least one of information about a channel occupancy time of a network device or slot format information of one or more slots corresponding to the channel occupancy time.

* * * * *

UNITED STATES PATENT AND TRADEMARK OFFICE
CERTIFICATE OF CORRECTION

| | |
|---|---|
| PATENT NO. | : 11,991,707 B2 |
| APPLICATION NO. | : 17/244310 |
| DATED | : May 21, 2024 |
| INVENTOR(S) | : Xu Zhang and Jianqin Liu |

It is certified that error appears in the above-identified patent and that said Letters Patent is hereby corrected as shown below:

In the Specification

In Column 1, In Line 12 (approx.) Delete "entireties," and insert -- entireties. --.

Signed and Sealed this
Twelfth Day of November, 2024

Katherine Kelly Vidal
*Director of the United States Patent and Trademark Office*